Jan. 30, 1962 P. S. WARD 3,018,742
APPARATUS FOR PROOFING AND BAKING BREAD
Filed Feb. 10, 1958 10 Sheets-Sheet 1

INVENTOR.
Paul S. Ward.
BY Wood, Herron & Evans,
ATTORNEYS.

Jan. 30, 1962 P. S. WARD 3,018,742
APPARATUS FOR PROOFING AND BAKING BREAD
Filed Feb. 10, 1958 10 Sheets-Sheet 2
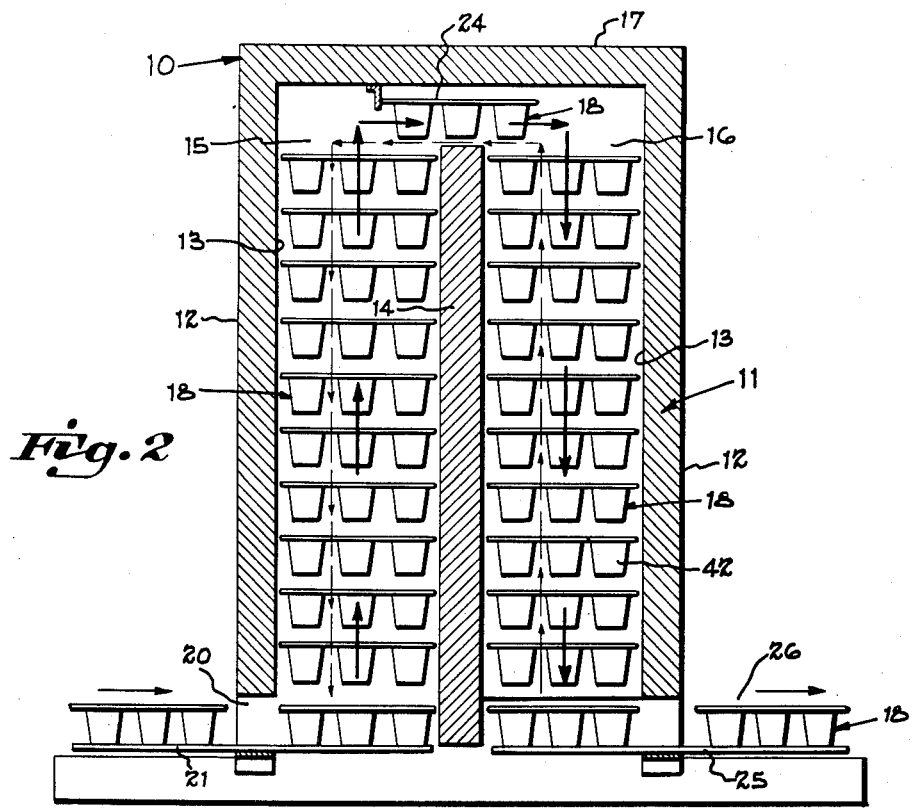
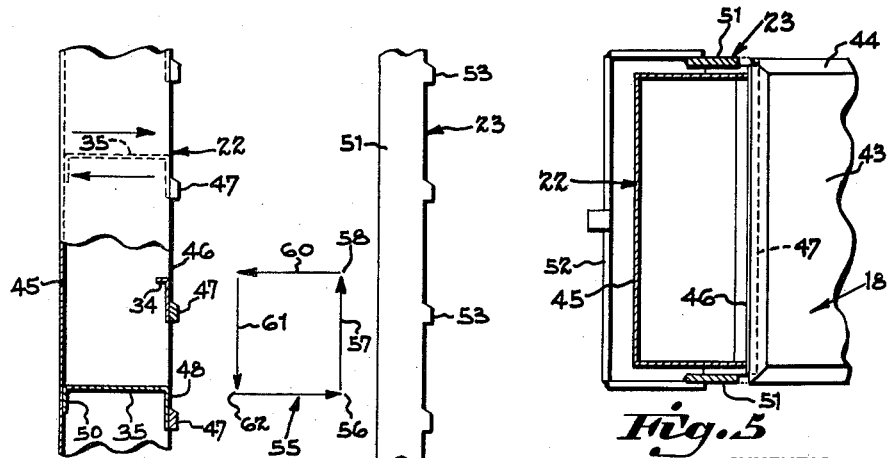
INVENTOR.
Paul S. Ward.
BY Wood, Herron & Evans.
ATTORNEYS.

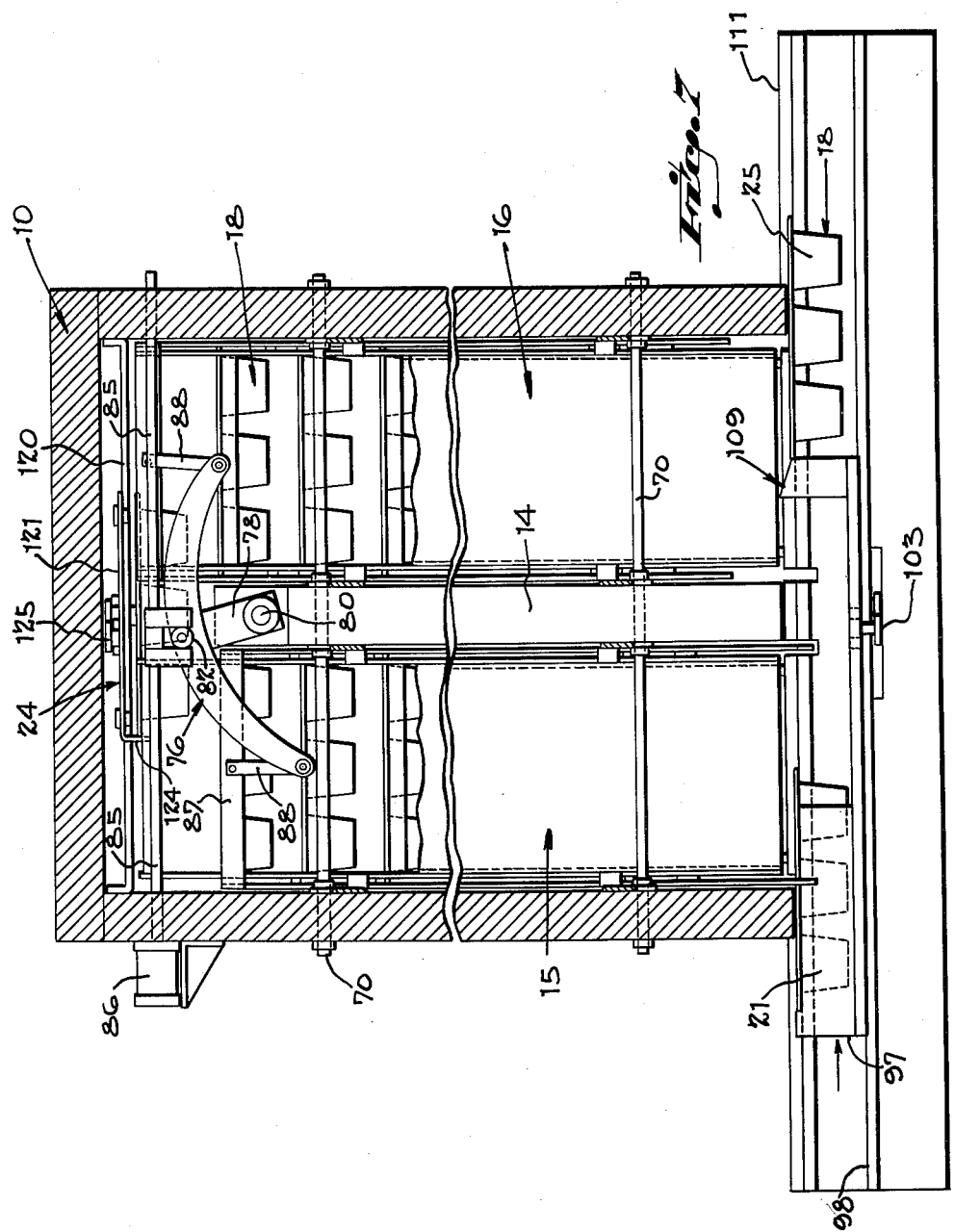

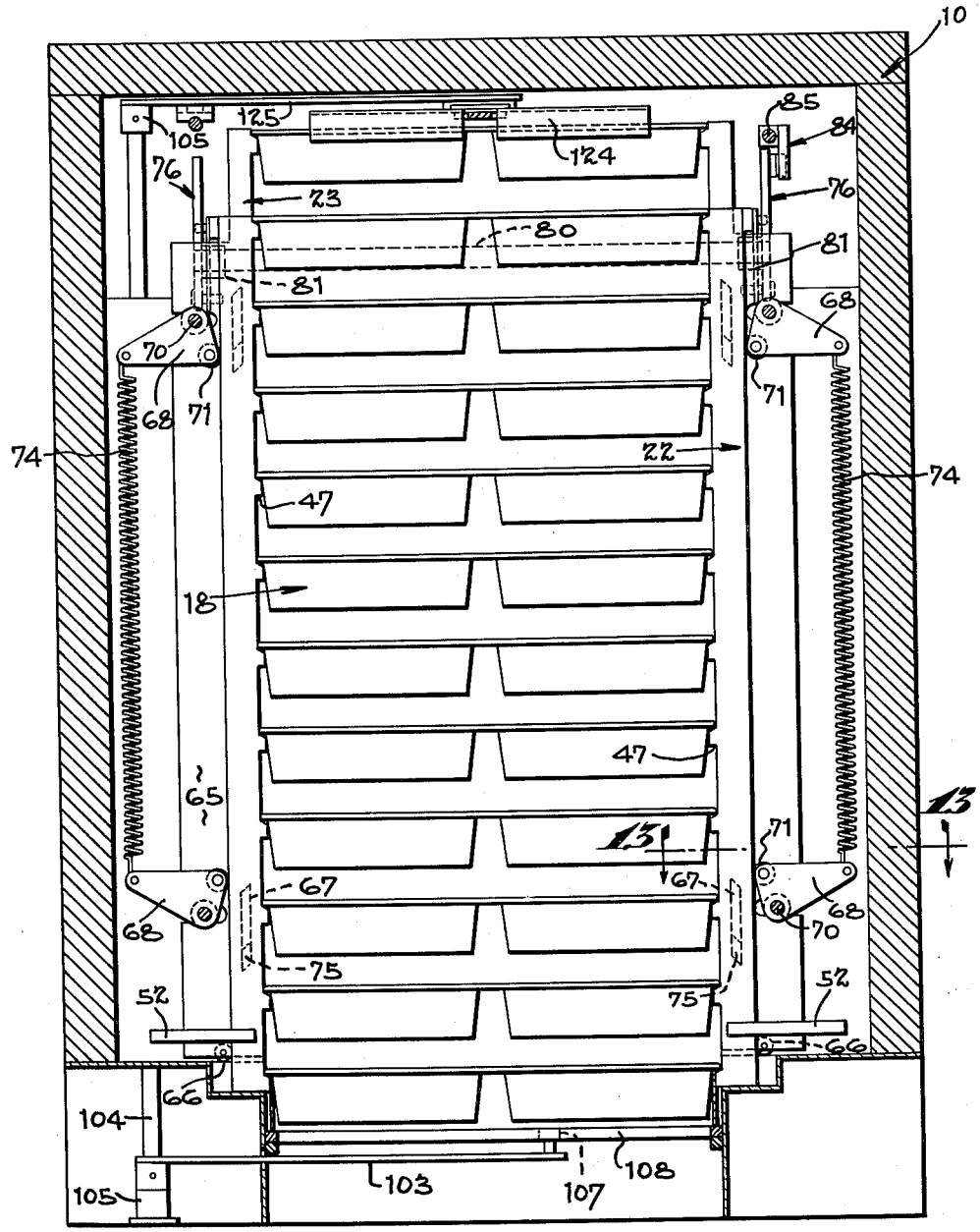

Jan. 30, 1962 P. S. WARD 3,018,742
APPARATUS FOR PROOFING AND BAKING BREAD
Filed Feb. 10, 1958 10 Sheets-Sheet 5
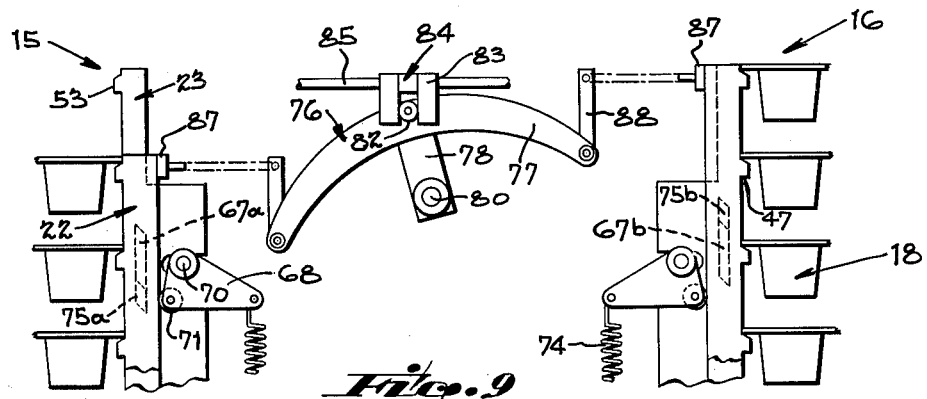
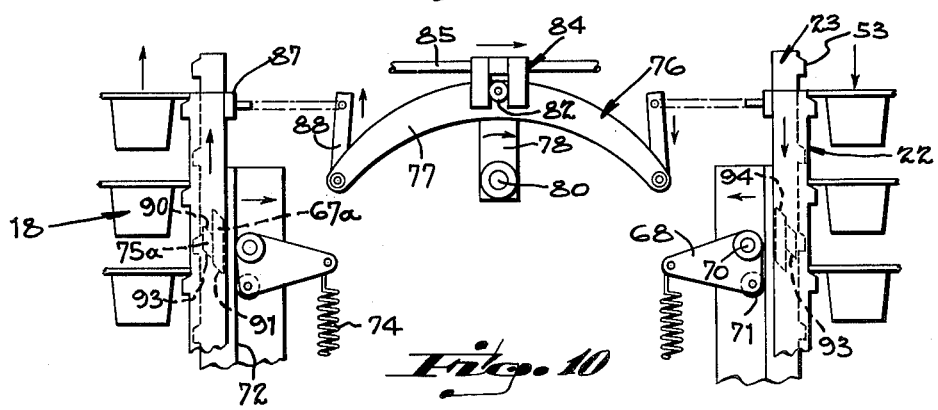
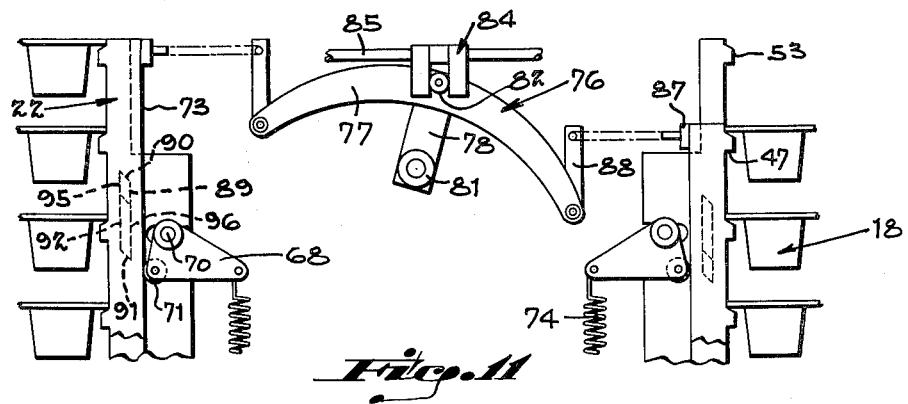
INVENTOR.
Paul S. Ward.
BY
Wood, Herron & Evans.
ATTORNEYS.

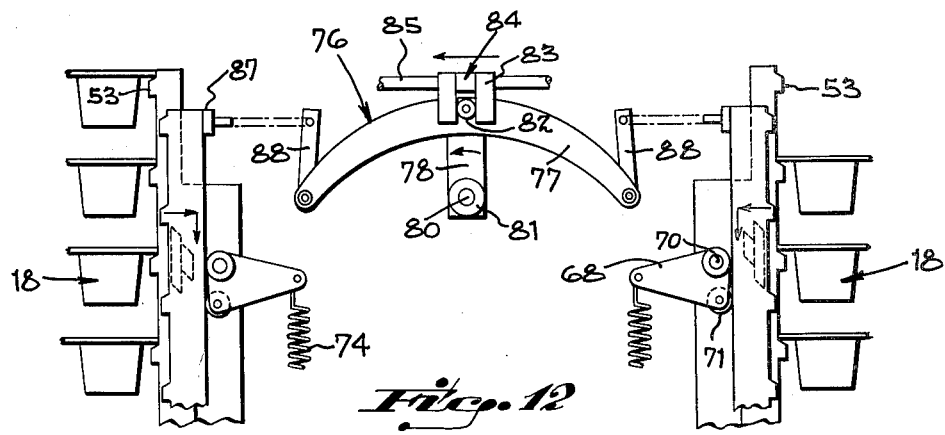
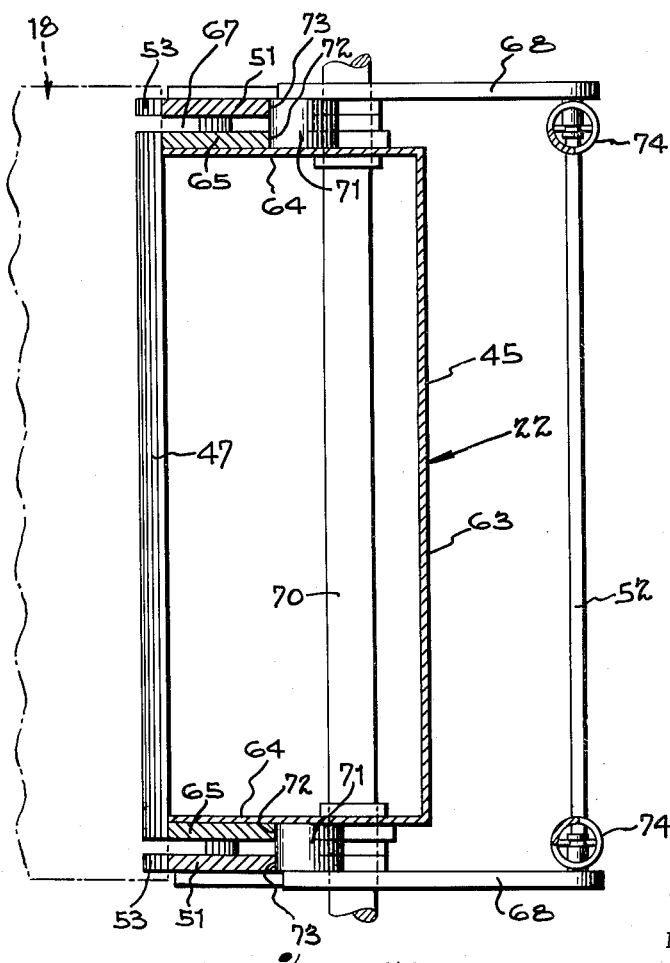

Jan. 30, 1962 P. S. WARD 3,018,742
APPARATUS FOR PROOFING AND BAKING BREAD
Filed Feb. 10, 1958 10 Sheets-Sheet 7
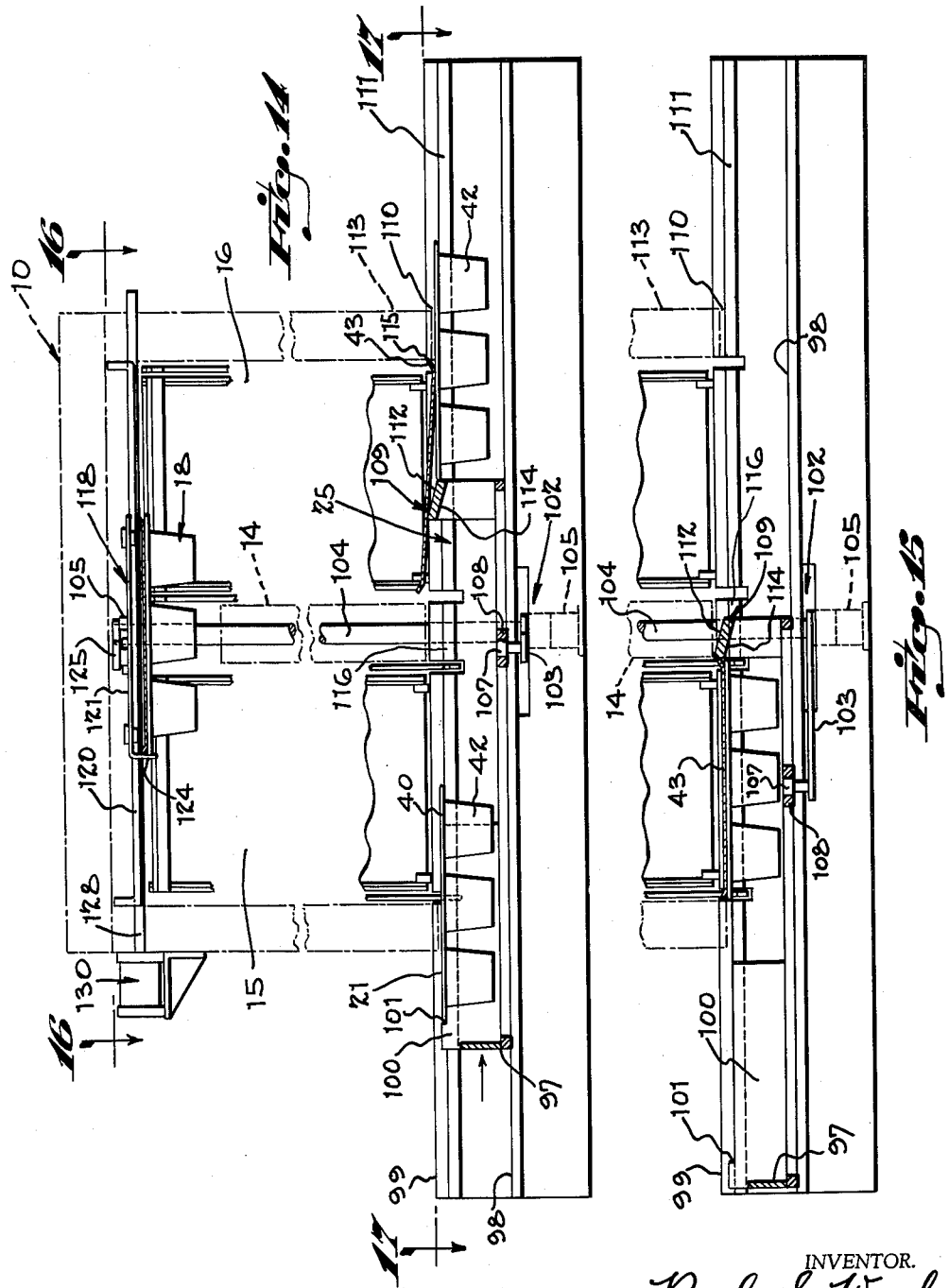
INVENTOR.
Paul S. Ward.
BY
Wood, Herron & Evans.
ATTORNEYS.

Jan. 30, 1962 P. S. WARD 3,018,742
APPARATUS FOR PROOFING AND BAKING BREAD
Filed Feb. 10, 1958 10 Sheets-Sheet 8

INVENTOR.
Paul S. Ward.
BY Wood, Herron & Evans.
ATTORNEYS.

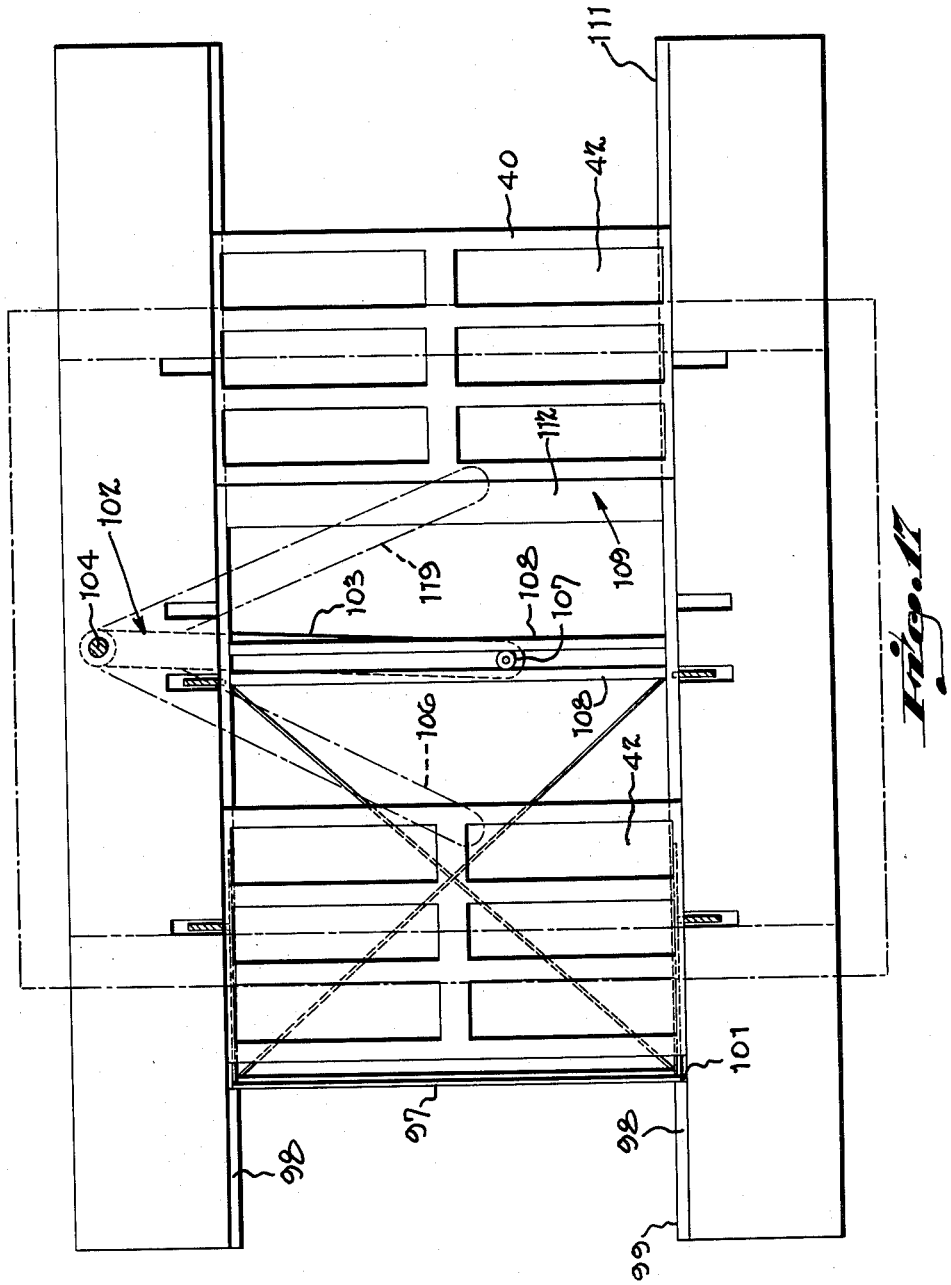

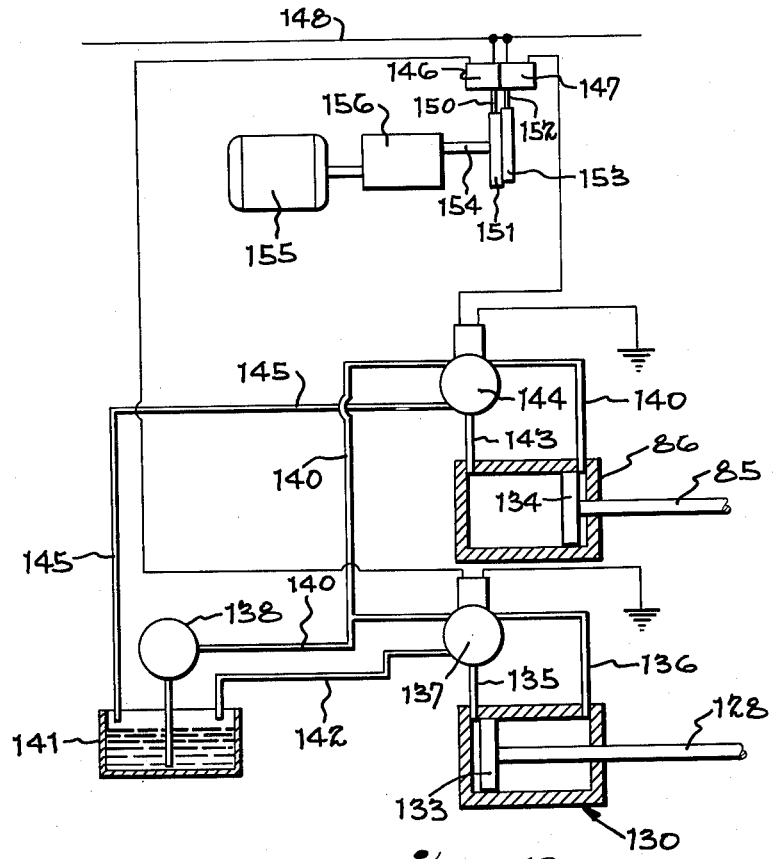

3,018,742
APPARATUS FOR PROOFING AND
BAKING BREAD
Paul S. Ward, 111 Court St., Cynthiana, Ky.
Filed Feb. 10, 1958, Ser. No. 714,670
10 Claims. (Cl. 107—55)

This invention relates to the art of producing bread and is particularly directed to a novel oven for carrying out the process for proofing and baking bread disclosed and claimed in Patent No. 2,785,642 for Method For Proofing And Baking Bread. This patent matured from application Serial No. 319,317 filed November 7, 1952. The present application is a continuation in part of application Serial No. 621,804, filed November 13, 1956, and now abandoned, for Apparatus For Proofing And Baking Bread. Application Serial No. 621,804 is in turn a divisional application of application Serial No. 319,317.

In conventional bakery practice where bread, rolls and the like are produced by quantity production methods, the dough is first separated into lumps by a divider and the lumps are rounded into balls by a machine known as a rounder, after which the balled lumps are transferred to a rest proofer where the dough is permitted to recuperate from the severe treatment which it received in the rounder. From the rest proofer the dough lumps are fed into a molder where the dough lumps are flattened and elongated to form thin sheets each of which is then curled into a scroll and deposited in a baking pan. During the sheeting process the dough is compacted to eliminate any large holes or voids so as to achieve a uniform porosity. When these thin sheets of dough are deposited in the baking pans they occupy only a small fraction of the volume occupied by the finished loaf.

After the dough has been placed in the baking pans, the pans are transferred to a proof box where they remain for a period of from 35 minutes to an hour and 15 minutes, the exact length of time, depending upon such factors as the size of the loaf, the nature of the dough, the condition within the proof box, and so forth. Generally, steam is injected into the proof box to maintain a warm and substantially saturated condition; for example, a temperature in the neighborhood of 90 degrees and relative humidity of 90 percent. The dough is maintained in this environment until it has risen or expanded to about two thirds of its final volume. This process is known as proofing and it essentially involves the generation of gas from the yeast within the dough, the gas being occluded in the gluten which forms a plurality of elastic envelopes. Also dehydration and tough skin formation are prevented while the dough is expanding.

After the dough has risen the desired amount, it is transferred to an oven where it is subjected to high temperatures generally of the order of 400 to 500 degrees for approximately 45 minutes. While in the oven, the bread further expands due to "oven spring" until it reaches full loaf size. During the baking process, the starch is made soluble, the ferment is killed, a portion of the moisture contained in the dough is driven off, and a brown crust is formed on the outer surface of the loaf.

The process of baking bread in a bakery is largely a mechanization of the time honored method of baking bread by hand. This method has long been followed by housewives in preparing homemade bread, and as outlined in Ann Pillsbury's Baking Book, this method consists of: mixing the ingredients, then kneading the dough on a floured board for approximately 5 minutes to obtain a fine grain. The dough is next placed in a greased bowl which is covered and placed in a warm (85 to 95° F.) atmosphere until the dough has risen so that its bulk is doubled. After the dough has risen a requisite amount, its center is punched down by plunging the fist in the center of the dough mass. The edges are then folded toward the center, and the dough is turned upside down in a bowl and covered. The dough is allowed to rise in a warm place for about a half hour before it is placed on a flour board and molded into balls. The balls are allowed to rest, closely covered, for 15 minutes before they are shaped into loaves and placed in greased bread pans. The bread pans are then covered with a damp cloth and stored in a warm place until the dough in each of the pans fills the pan with its center being well above the pan top. This requires about an hour and a quarter. Finally, the damp cover is removed and the dough is placed in a moderately hot oven, 375°, where it is baked for about 45 minutes.

The present invention is directed to that portion of the bread making process which occurs after the dough has been sheeted and panned, or after the corresponding hand steps of rolling into balls, shaping, and placing the balls into pans. This portion of the process is generally referred to as proofing and baking.

It is the concept of this invention to eliminate low temperature proofing of the dough as it has heretofore been carried out. Instead the dough is placed directly from the molder into the oven where it is subjected to continuously increasing temperatures and is in a sense proofed and baked simultaneously.

I have discovered that a piece of dough may be proofed and baked in this manner in a time less than the time previously required for baking alone. Consequently, one of the principal advantages of the present invention is that bread can be baked in about half of the floor time previously required to produce a finished loaf of bread after the dough has emerged from the molder.

One preferred manner of carrying out my process involves placing the dough in loosely covered pans which are moved in countercurrent relationship with a stream of warm air. The air is heated as it enters the oven, and constitutes the sole source of baking heat. The air gives up a portion of its heat to each of the pans of dough over which it passes. As a result, the dough entering the oven is enveloped by air at a relatively low temperature, for example, 120 degrees. As the dough progresses through the oven, the pans come into contact with warmer and warmer air until as they are ready to emerge, the pans are in contact with air at the highest desired baking temperature. This temperature may be of the same order as previously employed, or as I will explain later, it may be considerably lower; for example, 350 degrees.

When treated in this manner the dough is simultaneously heated and proofed. That is, during the initial period which the dough is in the oven, it blooms to its fullest volume and during approximately the same time the center portion, or core, of the loaf is heated to full baking temperature of approximately 210 degrees. This consumes approximately the first half of the oven time. During the remaining oven time the dough is completely baked and is partially dehydrated to form an even crust on each of its six sides.

I have determined that the paradoxical result, that unproofed dough, placed in a low temperature oven and then subjected to progressively increased temperatures, is baked in a lesser time than proofed dough which is inserted directly into a high temperature oven, is due to the highly changeable heat transfer properties of the dough mass. As previously explained, in the conventional baking process the dough is proofed to approximately two-thirds of its final volume before insertion into the oven. Dough which is thus proofed includes a large number of small gas-filled envelopes. In this state the dough is an excellent insulator.

In order to effect complete baking of the loaf the temperature of the core or center portion of the loaf must be raised to approximately 210°. This temperature rise is brought about by heat flowing through the dough from the outer surface to the center. By first proofing the dough and thus converting the loaf into a good insulator, the time needed for the required amount of heat to flow inwardly is tremendously increased. A second factor, tending to increase the baking time, is that by far the largest quantity of heat will flow into the core through the shortest dimension of the loaf. However, by proofing, prior to baking, this dimension (half the width of the loaf) has been increased to substantially that of the finished product. Thus, no only is a good insulator interposed between the core and the source of heat, but also the size of the insulator has been increased to further impede heat transfer. Additionally, the conventional proofing process results in appreciable amounts of condensate forming on the surface of the loaf, and a susbtantial amount of heat which otherwise could be used for heating the core is wasted in evaporating this condensate.

In the present process the dough is heated and the cooking or baking process started while the dough is still in a compact lump and is therefore in its optimum condition for heat transfer. Not only does the compaction of the lump result in a higher heat transfer coefficient of the dough, but in addition, the length of the path which heat must travel to reach the core is considerably reduced. A substantial portion of the heat required to elevate the core temperature is supplied to the core while the dough is in this condition; that is before the dough has become porous and expanded to loaf size. As a result the heat flows more rapidly and travels a shorter path so that the dough is raised to baking temperature much more rapidly than if it were previously proofed.

Furthermore, there is no condensate formed on the loaf and consequently no heat is needed to evaporate condensed moisture on the loaf before dehydration and crustation can take place. As a result, not only is the baking time reduced, but appreciably less heat is required to bake each loaf of bread. Furthermore, a considerable amount of valuable floor space, formerly occupied by the proofer is now free for the installation of other equipment.

Another advantage of baking bread in a countercurrent of warm air is that the temperature differential between the dough and the surrounding air remains substantially constant throughout the entire proofing and baking period. Thus, for example, if dough at room temperature is placed initially into a stream of 120° air, and finally emerges with a surface temperature of approximately 340°, from a stream of 350° air, the temperature differential is only varied from 45 to 10°. Compare this with the differential involved when 80° dough is placed in a 500° oven and is allowed to reach a surface temperature of 375 to 400° before removal. In this case, the temperature gradient varies from a value of 420° down to a value of 100 to 125°. A relatively constant temperature gradient is beneficial in two respects. In the first place, it provides a uniform, even baking action, and secondly, it gives rise to a thermodynamically efficient heat transfer.

Not only is bread baked in accordance with the present invention more quickly and more cheaply produced, but the loaf itself is of a superior quality. For example, I have discovered that a three pound loaf of bread baked in accordance with my invention will weigh one and one quarter ounces per pound more than a loaf baked in a conventional manner from identical dough. The additional weight is due to the amount of moisture retained in excess of the amount conventionally retained. This moisture will give the loaf a quality of freshness for an extended period of time. Also a superior crust formation has been obtained by baking bread in accordance with the principles I have outlined above. That is, an even tasty crust is formed on all six sides of the loaf and there is no light line along the loaf at the top of the pan as is normally encountered in conventional pan bread at pan height.

It is another object of this invention to provide a vertical oven in which dough may be proofed and baked in accordance with the method just outlined. In general, the oven includes two vertical chambers which are separated from one another by a vertical wall extending substantially the height of the oven, but being spaced from the top to permit communication between the two chambers. The baking pans for use with this oven, are grouped into "straps" each of which is constituted by several pans arranged in side by side relationship and joined at their upper edges by a large plate, the plate and pans presenting a continuous surface. The straps of pans are serially inserted in the oven near the bottom of one of the chambers, and are then shifted in step by step movements upwardly to the top of the chamber where they are transferred across the center wall and then caused to descend in a step by step movement within the second chamber to a point near its bottom where they are removed from the oven. Hereinafter the chamber in which the pans ascend will be called the "up" chamber, and the chamber in which they descend the "down" chamber.

The oven also includes means for introducing warm air into the lower portion of the down chamber near the point at which the pans are discharged. The warm air passes in a circuitous fashion upwardly between the straps of pans. The pans, together with the mechanism for supporting them, serve as baffles to direct the air flow, so that the warm air travels in one direction between one pair of vertically adjacent pan straps and then reverses its direction to flow between the next upwardly disposed pair of pan straps. The gas thus flows back and forth in the down chamber, each traverse being made at a higher level. When the gas reaches the top of the oven, it passes across the dividing wall and then flows downwardly in a serpentine fashion, between the straps of pans in a manner similar to that in which it flowed in the down chamber. Finally, the gas is withdrawn from the bottom of the up chamber by an exhaust column which is effective to provide a stack effect for drawing the warm air through the oven.

No heat is supplied to the oven except that furnished by the warm air. As a result, the temperature at the charging opening is relatively low since the greater portion of the heat in the air has been given up to the pans over which it has passed. As the pans progress through the oven however, they encounter warmer and warmer air until by the time they reach the discharge opening they are surrounded by air at the maximum baking temperature.

One of the principal advantages of the present oven is that it requires a minimum amount of floor space in the bakery. At the present time, the most common type of oven employed commercially for baking bread is a traveling hearth oven. A traveling hearth oven is constructed of refractory material, and is generally in the form of a long tunnel which often extends 125 feet. Heat is continuously supplied to the lower portion of the oven while the pans slowly progress from one end to the other. The entire oven is maintained at substantially the maximum baking temperature.

In contrast with this, the oven of the present invention requires only a minimum amount of floor space, for example, 25 square feet, and employs to a full extent the overhead space which would otherwise be wasted.

A further advantage of my oven is that the pans do not contact any heated surface, so that the pans remain free from hot spots which would cause localized areas of the bread to burn. In the present oven, heating is accomplished solely by convection currents of turbulent air, the air in contact with any particular strap of pans raising the entire strap to a substantially uniform temperature so that the bread is evenly baked. Thus, the pans at no time contact any part of the oven at a higher temperature than the temperature of the pans. This is in sharp contrast with a conventional hearth oven, where unevenness of the hearth and pan bottoms results in certain areas of the pans absorbing more heat than other portions, so that uneven baking and sometimes burning of the loaf occurs.

Another extremely important advantage of the present oven is that there is substantially less heat wasted than in a conventional hearth oven where a tremendous quantity of heat spills out of the two end openings. The heat losses in hearth ovens are so large that hoods are generally provided to collect the escaping hot gases and channel them to a stack. In the present oven, there are practically no "spill-out" losses; the gases are drawn away from the pan discharge opening by the prevailing draft, and by the time they reach the pan charge opening, they have given up almost all of their heat so that little heat is lost there.

One of the principal construction features of the present oven is the arrangement of the pans, and the pan moving mechanism, whereby the pans and moving mechanism function as baffles to direct the warm air flow through the open. The air is channeled so that its path is several times as long as the path of the pans. In the embodiment herein illustrated for example, the air travels approximately ten times the distance that the pans move. Consequently, every portion of the air stream contacts a maximum amount of pan surface, and optimum heat transfer conditions prevail.

One of the specific objects of the present invention is to provide an oven including novel and extremely simple means for moving the hold and lift ladders in synchronism.

Another object of the present invention is to provide novel means for automatically transferring the lid from a set of pans being discharged from the oven to a set of pans entering the oven so that the lids never leave the oven. This not only minimizes the number of lids required, but more importantly eliminates manual handling of the lids which results in an appreciable labor saving. This is further advantageous since an appreciable amount of heat is conserved.

While, as explained above, the present oven is particularly adapted for use in proofing and baking bread in accordance with the method described in Patent No. 2,785,642, it is contemplated that the oven can also be advantageously used for baking other products, as well as in drying and other heating applications. More particularly, the present oven provides an extremely advantageous apparatus for carrying out my novel baking process and this process is described in detail to show the relationship of the oven construction to the process desiderata. However, many of the above described advantages of the oven such as its compactness and efficiency as well as many of the mechanical features of the oven including the novel pan transferring and shifting mechanisms, the lid transferring apparatus and the hold and lift ladder actuating mechanism together with the counterflow arrangement making the oven advantageous for many other applications, Other objects and advantages of the present invention will be apparent from the following detailed description of the drawings in which:

FIGURE 2 is a diagrammatic vertical cross-sectional view through a bake oven taken at right angles to the section at FIGURE 1, showing both the "up" and "down" chambers.

FIGURE 3 is a partial diagrammatic view of a hold ladder, partially broken away to show the baffle plates.

FIGURE 4 is a partial diagrammatic view of a lift ladder and a schematic representation of its movement.

FIGURE 5 is a diagrammatic horizontal cross-sectional view through the hold and the lift ladders showing the manner in which they engage the pans.

FIGURE 7 is a vertical cross-sectional view similar to FIGURE 1 showing details of the hold and lift ladders and pan shifting mechanisms.

FIGURE 8 is a vertical cross-sectional view through the oven taken at right angles to the section of FIGURE 7 showing additional details of construction.

FIGURE 9 is a layout view showing the position of the hold and lift ladders at the beginning of a cycle of operation.

FIGURE 10 is a layout view similar to FIGURE 9 showing the hold and lift ladders during vertical movement of the lift ladders.

FIGURE 11 is a layout view similar to FIGURE 9 showing the lift ladders in a position in which they have returned slightly from limits of their movement.

FIGURE 12 is a layout view similar to FIGURE 9 showing the lift ladders during their return movement.

FIGURE 13 is an enlarged cross-sectional view taken along line 13—13 of FIGURE 8.

FIGURE 14 is a side elevational view partially broken away showing the transfer mechanism and shuttle mechanism.

FIGURE 15 is a view of the transfer mechanism showing the manner in which the pan lid is returned to the up chamber.

FIGURE 17 is a cross-sectional view taken along line 17—17 of FIGURE 14.

FIGURE 18 is a schematic diagram showing the electrical and hydraulic circuits for actuating the transfer and shuttle mechanisms and actuating the hold and lift ladders.

*General description*

Figure 1:
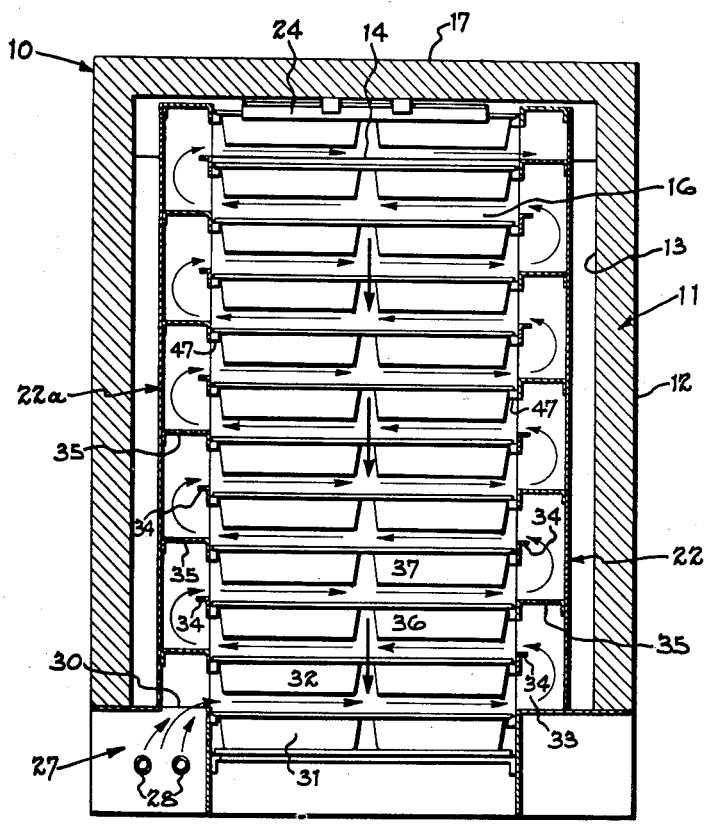
FIGURE 1 is a diagrammatic vertical sectional view through the oven showing the pan arrangement and path of gas flow in the "down" chamber.

FIGURES 1 and 2 show both the general arrangement of the oven and one preferred manner of carrying out the process of this invention. The structure of the oven will be explained in greater detail below, and in order to illustrate the utility of the oven a fuller explanation will be given of the manner in which the oven functions to carry out the proofing and baking steps of my novel process. When installed in a bakery, the oven is placed so that it may be charged with pans filled with raw dough, the pans preferably being transferred directly from the molder-panner to the oven. This transfer may be accomplished manually or automatically by means of a suitable conveyor mechanism, the important thing being that the pans are not routed to a proof room before they are charged into the oven. More specifically, the oven 10 includes a housing 11 which is preferably constituted by a metal outer shell 12 and an inner shell 13 insulated from one another. A vertical center wall 14 extends transversely through the housing dividing it onto an "up" chamber 15 and a "down" chamber 16. The top of wall 14 is spaced from the top 17 of the oven a sufficient distance to permit passage of the pans 18 from the up chamber to the down chamber over the top of the center wall.

The straps of pans 18 containing the dough pieces are fed into the oven through charging opening 20, preferably located in the front wall of the housing at a point convenient for the operator. The pans are fed, either by hand or from a suitable conveyor (not shown), to a transfer mechanism 21. The transfer mechanism 21 advances the trays serially into engagement with the hold and lift ladders 22 and 23 which function to move the trays upwardly in chamber 15 and downwardly in chamber 16 in a step by step movement as will be explained below. A shuttle mechanism 24 is mounted at the top of housing 11, and is effective to shift the trays from the ladders in the up chamber to the ladders in the down chamber. After the pans have passed through the down chamber, they are engaged by a second transfer mechanism 25 by means of which they are discharged from the oven to a position indicated at 26 from which they may be removed either by hand or a suitable conveyor arrangement (not shown).

The heating chamber 27 is located in the lowermost portion of the housing adjacent the down chamber. Heat may be supplied to this chamber in any suitable manner. Preferably, a combustible gas is supplied through burner pipes 28; this gas is burned within the chamber, and is mixed with air which is introduced into the chamber through a suitable opening (not shown). The air becomes heated, and the hot air and gases are then discharged from chamber 27 and introduced into down chamber 16 through opening 30. The hot air passes transversely across the down chamber between the two lowermost straps of pans indicated at 31 and 32. The pans themselves function as baffles to direct the air flow. If desired, a suitable blower can be provided for producing a forced circulation of air through the oven.

As the warm air emerges from between the two lowermost rows of pans, it passes into hold ladder 22 which is a substantially channel shaped member having its open end disposed inwardly toward the pans. The air enters the lowermost space 33 of the hold ladder 22, passes over baffle bar 34, and is trapped under baffle plate 35 which prevents further rise of the air within the hold ladder. The air is thus channeled outwardly from the hold ladder and again passes transversely across the down chamber; this time between the second and third straps of pans 32 and 36. The air moves between these straps of pans, in a direction opposite its previous travel, until it enters the opposite hold ladder 22a where it is trapped between baffle bar 34 and baffle plate 35 which are aligned horizontally with the baffle plate and bar, respectively, of hold ladder 22. The air passes over baffle bar 34, and emerges from the hold ladder between that baffle bar and baffle plate 35.

The warmed air travels back and forth across the down chamber, in this same fashion, until it reaches the top of down chamber 16. It then passes over the top of wall 14 and enters up chamber 15 where it descends in a serpentine fashion, passing back and forth between adjacent rows of pans in the same manner that it previously ascended in chamber 16. The baffle arrangement in the down chamber is identical with that in the up chamber, the only difference being that in the up chamber it is effective to channel the warm air in a descending path rather than in an ascending one.

The air is withdrawn from the lower portion of the down chamber through an exhaust opening (not shown). The opening preferably is connected to a flue or other means for providing a slight pressure head to draw the air through the oven. The light arrows in FIGURES 1 and 2 represent the general direction of gas flow, while the heavier arrows indicate the direction of pan movement.

Figure 6:
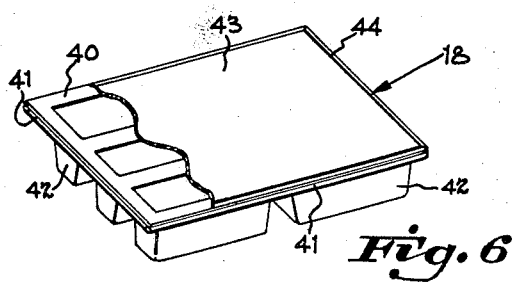
FIGURE 6 is a perspective view of a strap of pans, the cover plate being partially broken away.

One preferred form of pan for use with this oven is shown in FIGURE 6. As there shown, a strap of pans 18 is constituted by a rectangular plate 40 having a beaded peripheral edge 41; a plurality of spaced dough wells or pans 42 depend from plate 40. The beaded edge 41 extends outwardly beyond the edges of the pans, and is adapted for engagement with the hold and lift ladders. A cover plate 43 having an overturned edge 44 is adapted for placement on top of the plate 40 to cover up the openings of wells 42. The cover plate 43 does not, however, form a hermetic seal with the pans, and gas and moisture can enter or escape from the pans between plate 40 and cover 43.

The hold and lift ladders are shown diagrammatically in FIGURES 3, 4, and 5 and are shown in more detail in FIGURES 7–13. As shown in FIGURES 3–5, in general hold ladder 22 includes a U-shaped frame 45, the open end of which extends toward the interior of the oven. A plurality of baffle bars 34, preferably constituted by right angled members, are secured as by spot welding to arms of frame 45. These baffle bars extend across the open end of the hold ladder, and are preferably arranged so that one portion of the bar extends vertically along the inner edge 46 of the ladder and the angulated portion of the bar extends horizontally toward the interior of the ladder. A support bar 47 is secured to the hold ladder at a point spaced downwardly from the angulated upper portion of each baffle bar.

Disposed intermediate each pair of baffle bars is a baffle plate 35, the baffle plate extends horizontally across the hold ladder, and is effective to prevent vertical passage of gas within the ladder. Baffle plate 35 includes a front flange 48 and a rear flange 50, both flanges being spot welded, or otherwise secured, to the hold ladder. A support bar 47 is also secured to the inner edge of the hold ladder at a point spaced downwardly from each of the baffle plates. The support bars are regularly spaced so that irrespective of whether the support bar is associated with a baffle plate or a baffle bar, it is the same distance from the support bar above it and the one below it.

The lift ladder 23 is constituted by two vertical members 51—51, which are maintained in parallel relationship by one or more U-shaped cross braces 52. Each vertical member 51 includes a plurality of pan engaging fingers 53 which are spaced vertically from one another the same distance that the support bars 47 of the hold ladder are spaced from one another. The arms of cross brace 52 and vertical members 51 are spaced apart a distance greater than the width of the hold ladder 22. As a result, the hold ladder may be embraced within the vertical members and cross brace of the lift ladder, as shown in FIGURE 5, so that both the support bars 47 and pan engaging fingers 53 can simultaneously engage the beaded edge 41 of a strap of pans 18.

The hold ladder is mounted for movement horizontally so that it can be advanced toward, or retracted from, a position in which support bars 47 engage pan 18. The lift ladders 23 are mounted for rectilinear movement; that is, these ladders can be moved up or down in a vertical plane and inwardly or outwardly in a horizontal plane, toward or away from a position in engagement with the pans.

In operation, the pans are fed by the transfer mechanism 21 into a position in which they rest on the lowermost support bars 47 of the two hold ladders in the up chamber. The lift ladders are then advanced so that both the lift ladders and hold ladders engage the pans. The advancing motion of the lift ladders is represented diagrammatically at 55 in FIGURE 4. After the lift ladder has reached its advanced pan engaging position at 56, the hold ladders are retracted out of engagement with the edges of the pans. The lift ladders are then shifted vertically, as indicated at 57, until the pans have been raised an amount corresponding to the distance between adjacent support bars 47 of the hold ladders. When the pans have been so advanced, as indicated at 58, the hold ladders are brought back into engagement with the pan edges. Subsequently, the lift ladders are withdrawn from engagement with the pans as indicated at 60, the pans being supported now solely by the hold ladders. After the lift ladders are free of the pans, they are lowered an amount equal to the distance they were previously raised. This movement is indicated at 61. The cycle is then repeated beginning with an inward movement of the lift ladders as shown at 62.

The movements of the hold and lift ladders in the down chamber are essentially the same as those in the up chamber. However, the sequence is reversed so that the lift ladders engage the pans during their downward travel, the hold ladders being retracted; while the hold ladders engage the pans during the period in which the lift ladders are raised. In this manner the pans are shifted in a step by step movement upwardly in the up chamber, across the top of the dividing wall 14, and downwardly in the down chamber to the discharge opening.

Typical operation

When baking loaves in the oven in accordance with the process of Patent No. 2,785,642, the raw dough, which has been sheeted but not proofed, is supplied to the oven in loosely covered pans. The covers are effective to retain a portion of the moisture and gases liberated during the baking process, but the pans are not hermetically sealed so that moisture and gases can escape or enter the bread compartments. When the pans first enter the oven through the charging door, they are surrounded by air at a relatively low temperature (preferably of the order of 120°), the air at that point having passed over all of the pans in the oven, and thereby given up a large portion of its heat. As the pans progress through the oven, they continually come into contact with air which is warmer than that to which the dough has previously been exposed. This process continues until the dough reaches a position near the discharge opening of the oven where it is subjected to the newly entering gases which are at the maximum baking temperature, and of a relatively low humidity. The exact maximum temperature can be selected by the baker in order to produce the type of loaf he desires from the particular dough he employs. I have determined, however, that a loaf of excellent quality can be produced using a maximum temperature of 350° as compared with a temperature of from 400° to 500° as currently utilized.

During approximately the first half of its travel through the oven, the dough is heated and proofed. The dough is initially placed in an atmosphere at a temperature of the order of 120° F. While this temperature is not particularly critical, and the initial temperature may vary an appreciable amount above or below this figure, the initial temperature can generally be characterized as being an appreciable amount above the normally proofing temperature and yet only a small fraction of the normal baking temperature. The heat supplied to the dough is effective to aid in the generation of gas from the yeast, so that the dough lumps begin to expand and give off moisture. Most of this moisture is entrapped within the pan, so that in a sense the dough produces its own humid atmosphere which further aids the proofing process. Simultaneously, heat starts to flow into the core of the lump to raise its temperature.

As the dough progresses through the oven, it comes into contact with warmer and warmer air, and by the time it reaches the top of the up chamber, the dough has expanded to its final volume and the core temperature has risen to approximately 210°, its full baking temperature. During the last half of its oven travel, the dough is surrounded by still warmer air, the air now being at a sufficient temperature to evaporate the moisture from the pan and partially dehydrate the loaf itself. This dehydration of the loaf is accompanied by the formation of a soft even crust which appears on each of the sides of the loaf.

It should be noted that when dough is baked in closed pans, the liberated moisture from the loaf is initially entrapped within the pan and in effect performs two functions. In the first place, it aids the proofing process, and secondly, it inhibits crust formation and thereby tends to keep the dough in a good heat conductive state. (Bread crust being cellulosic in nature is an extremely poor heat conductor.) The entrapped moisture is driven off from the pan only after the core of the loaf has been raised to baking temperature, and the heat transfer properties of the load are no longer of extreme importance.

While I have disclosed the baking and proofing process as employed with covered baking pans, it will be understood that this process can also be utilized with dough which is baked in open pans. When producing a loaf of open hearth bread in accordance with this invention, the dough is deposited in open baking pans and is again charged into the oven directly from the molder-panner. A countercurrent flow of air is provided, and the temperature conditions in the oven are maintained generally as they exist when covered pans are employed. However, it may be desirable to employ slightly lower temperatures when baking open hearth bread, especially if a light crust is desired.

The countercurrent relationship of the dough movement and air stream presents a unique advantage when baking open hearth loaves since the humidity and temperature conditions of the air stream is continuously varied so as to approximate the optimum conditions for processing the dough. That is, the air in the up chamber is at a lower temperature and greater humidity than the air in the down chamber, since the air in passing over the dough gives up heat and absorbs moisture.

This relatively humid and moderately warm air provides an atmosphere which facilitates the obtaining of a good proof. Then after the dough has expanded, and its core has been heated, dehydration and crustation take place in the hotter drier portions of the air stream.

Detailed description

The detailed construction of one preferred form of lift and hold ladders and means for shifting the ladders is shown in FIGURES 7–13. While the particular construction there shown is highly advantageous because of its simplicity and the fact that the movements of the hold and lift ladders are automatically and positively synchronized, those skilled in the art will readily appreciate that many different mechanisms can be employed for shifting the ladders.

As best shown in FIGURES 8 and 13, each of the hold ladders 22 comprises a U-shaped frame 45 including a cross wall 63 and two parallel walls 64—64, defining an opening facing toward the interior of the oven, the inner edges of walls 64—64 carrying a plurality of spaced support bars 47. Vertical plates 65 are welded or otherwise secured to the outer surface of walls 64, plates 65 extending substantially the entire height of the oven. The lower ends of plates 65 preferably carry suitable rollers 66 adapted to track upon a suitable portion of the oven housing for facilitating in and out movement of the hold ladders. Each of the vertical plates 65 also carries two generally diamond shaped cam members 67 (FIGURE 8). For purposes of clarity the cams associated with the lift ladders in the up chamber 15 will be designated 67a while those carried by the lift ladders in the down chamber will be designated 67b (FIGURES 9 and 10). These cam members are mounted on the outer wall of each plate 65 intermediate that plate and the adjacent vertical member 51 of a lift ladder 23.

Each of the lift ladders 23 comprises two vertical members 51 spaced outwardly from the vertical plates 65 of a hold ladder assembly. Vertical members 51 are interconnected by one or more U-shaped braces 52 which extend outwardly beyond transverse wall 63 a sufficient distance to allow in and out relative movement between the hold ladder 22 and lift ladder 23.

Each of the vertical members 51 of the lift ladders carries two spaced diamond shaped cams 75 (FIGURE 8) mounted on the inner face of members 51 between members 51 and plates 65 of the hold ladders. Diamond shaped cam members 75 are disposed to reside in vertical alignment with cams 67 when the hold and lift ladders are both in engagement with the pans, cams 75 being disposed below cams 67 when the lift ladders are in their lowermost position as shown in FIGURE 8. The cams in up chamber 15 are indicated by 75a while those in the down chamber are marked 75b.

Both the hold and lift ladders are spring urged inwardly into contact with the pans by means of rocker arms 68. Preferably, two rocker arms are provided for each hold and lift ladder. Each of the rocker arms 68 is pivotally mounted upon a rod 70 extending across the oven and secured to the oven walls as best shown in FIGURES 7, 8 and 13. Each of the rocker arms 68 carries a roller 71 which abuts the rear edges 72 and 73, respectively, of plates 65 and vertical members 51 of the hold and lift ladders. The free ends of each pair of arms 68 are interconnected by means of a tension spring 74 so that the arms tend to rotate around shafts 70 and rollers 71 are forced into engagement with plates 65 and vertical members 51. In this manner, the hold and lift ladders are at all times spring urged toward straps of pans 18. However, either the hold or lift ladders can be forced outwardly against the force of springs 74 by causing rocker arms 68 to pivot around shafts 70.

The mechanism for shifting the hold and lift ladders further includes pivoted walking beams 76—76, one of these beams being disposed on each side of the oven and extending into up chamber 15 and down chamber 16. As shown in FIGURES 9–12 inclusive, each of the walking beams 76 comprises an arcuate arm or beam member 77 rigidly secured to a mounting arm 78 so that the beam member and mounting arm form a generally T shaped assembly. Arm 78 is mounted upon a shaft 80 which is pivotally journalled in any suitable manner in journals 81 mounted upon the oven frame. Arcuate beam members 77 of the main walking beam also carry a roller 82 in engagement with blocks 83 of drive yoke 84. This yoke is rigidly secured to an elongated rod 85 secured to a piston mounted in double acting hydraulic cylinder 86. Rod 85 is reciprocated by the piston rod and in its reciprocation causes walking beam 76 to rock back and forth. This beam in turn rocks shaft 80 which drives walking beam member 77. Each of the ends of each walking beam member 77 carries a link 88 pivotally joined to the end of the walking beam member and to a cross strap 87 interconnecting vertical members 51 of the lift ladder in either the up or down chamber.

As best shown in FIGURE 7, when the walking beams are tilted to the left, the lift ladder in up chamber 15 is in its lowermost position while the lift ladder in the down chamber 16 is in its uppermost position. Conversely, when walking beams 76 are tilted to the right, the lift ladder in the up chamber is shifted to its lowermost position and the lift ladder in the down chamber is shifted to its uppermost position.

The manner in which movement of the walking beams effects movement of both the lift and hold ladders is best shown in FIGURES 9–12. It is to be understood that these views are diagrammatic layouts in which the ladders have been rotated 90 degrees from a plane perpendicular to the sheet to a plane parallel to the sheet for purposes of illustration. The left hand ladders represent the ladders in up chamber 15 while the right hand ladders represent the ladders in down chamber 16.

FIGURE 9 shows the position of the various ladders and the yoke at the beginning of a cycle of operation. At this point in the cycle a strap of pans has been transferred to the lowermost set of fingers 53 of the lift ladders and lowermost support bars 47 of the hold ladders in the up chamber 15 of the oven. Both the hold ladders and lift ladders are forced inwardly into engagement with the pans by the action of rocker arms 68. In the embodiment shown, the inward movement of these members is limited by pans 18 so that a firm grip on the pans is assured. However, it is to be understood that if desired suitable stops can be provided for limiting inward movement of the lift and hold ladders. At the same time in down chamber 16 of the oven, a strap of pans has been shifted by transfer mechanism 24 to the uppermost fingers 53 of the lift ladders and uppermost bars 47 of the hold ladders.

At the start of the cycle of operation, the piston of hydraulic cylinder 86 shifts rod 85 to the right and the engagement of yoke 84 with roller 82 causes walking beam 76 to pivot in a clockwise direction as viewed in FIGURE 10. This causes lift ladders 23 in up chamber 15 to be raised through the interconnection provided by link 88 between the left hand arm of walking beam member 77 and cross strap 87. As the lift ladder is raised, upper sloping faces 90 of cams 75a carried by the lift ladder are forced upwardly against lower faces 91 of cams 67a carried by the hold ladder. Cams 75a thus force cams 67a to the right, outwardly in FIGURE 10 to disengage the hold ladders from the pans permitting upward vertical movement of the lift ladders which carry the pans upwardly relative to the retracted hold ladders as shown in FIGURE 10. The outward movement of the hold ladders is resisted by the action of rocker arms 68 through the engagement of rollers 71 with plates 65 but the hold ladders are positively displaced by the action of cams 67a and 75a so that rocker arms 68 pivot about rods 70 permitting outward movement of the hold ladders. However, rollers 71 of rocker arms 68 remain in engagement with plates 65 and continue to urge the hold ladders inwardly. This force is in turn transmitted to the lift ladders to hold them inwardly in engagement with the pans through the engagement of vertical opposed faces 89 and 92 of cams 67a and 75a respectively.

At the same time that lift ladders 23 are being raised in the up chamber, lift ladders 23 in the down chamber are being lowered through the connection of links 88 secured to the right hand ends of walking beam members 77 and cross straps 87 secured to vertical members 51 of lift ladders 23. As lift ladders 23 in the down chamber start their downward movement, the lower faces 93 of cams 75b carried by the lift leaders engage the uppermost faces 94 of cam 67b carried by the hold ladders. Cams 67b thus force the hold ladders outwardly to disengage the hold ladders from the pans and permit downward movement of the pans relative to the hold ladders. As shown in FIGURE 10, inward movement of the hold ladders causes rocker arms 68 to pivot about shaft 70. However, rocker arms 68 maintain a pressure upon the hold ladders forcing them inwardly and this inward pressure is in turn transmitted to the left ladders through the movement of opposed vertical faces 95 and 96 of cams 75a and 67a respectively.

The relative positions of the lift and hold ladders at the mid point of the cycle is shown in FIGURE 11. As there shown, the rocker arm 76 has been pivoted to its extreme right hand position so that the left hand end of beam member 77 is lifted and the right hand end of beam member 77 is raised. Thus, the lift ladders in the up chamber 15 are lifted to their uppermost position through the interconnections of links 88 and cross straps 87. In this position of the walking beam, the lowermost edges of cams 75 pass upwardly beyond the upper edges of cams 67, momentarily disengaging the cams and permitting hold ladders 22 to be shifted inwardly by the engagement of rollers 66 with vertical plates 65. The lift ladders are maintained in their innermost position, also in engagement with the pans, by the engagement of rollers 71 with vertical members 51. It will be appreciated that at this point each strap of pans in the up chamber has been lifted from one set of support bars 47 of the hold ladders to the next uppermost set of support bars 47 of the hold ladders.

In the same manner, at the half-way point in the cycle, in the down chamber 16 the lift ladders 23 are in their lowermost position, cams 75 having passed downwardly beyond cams 67 and the hold ladders are shifted inwardly under the influence of rocker arm 68 so that both the hold and life ladders are in engagement with the pans 18. In the down chamber during this portion of the cycle, each set of pans has been lowered from one pair of support bars 47 of the hold ladders to the next lowermost bars 47 of the hold ladders.

At the start of the return portion of the cycle the piston in cylinder 86 is retracted, drawing rod 85 to the left as shown in FIGURE 12. This causes the walking beam to pivot in a counterclockwise direction as viewed in FIGURE 12, raising the right hand of beam 77 and lowering the left hand end. Thus, the lift ladders in up chamber 15 are lowered through the interconnection provided by links 88. In this portion of the cycle, the lower faces 93 of cams 75b are forced against the upper faces of cams 67b, and cams 75b are forced outwardly so that the lift ladders are shifted away and disengaged from the pans. Rollers 71 of rocker arms 68 tend to resist outward movement of the lift ladders; and the inward thrust exerted by these rollers against the lift ladders is transmitted through cams 67 and 75 to hold ladders maintaining these ladders in engagement with the pans. The pans are thus supported during this portion of the cycle by bars 47 of the hold ladders, and the lift ladders 23 are returned freely to their lowermost position indicated in FIGURE 9.

In the down chamber 16 links 88 force the lift ladders upwardly to bring the upper faces 90 of cams 75a against the lower faces 91 of cams 67a. Cams 75a are thus forced outwardly and the lift ladders are forced outwardly out of engagement with the pans. During the portion of the cycle in the down chamber the lift ladders are lifted to their initial starting position shown in FIGURE 9.

Figure 16:
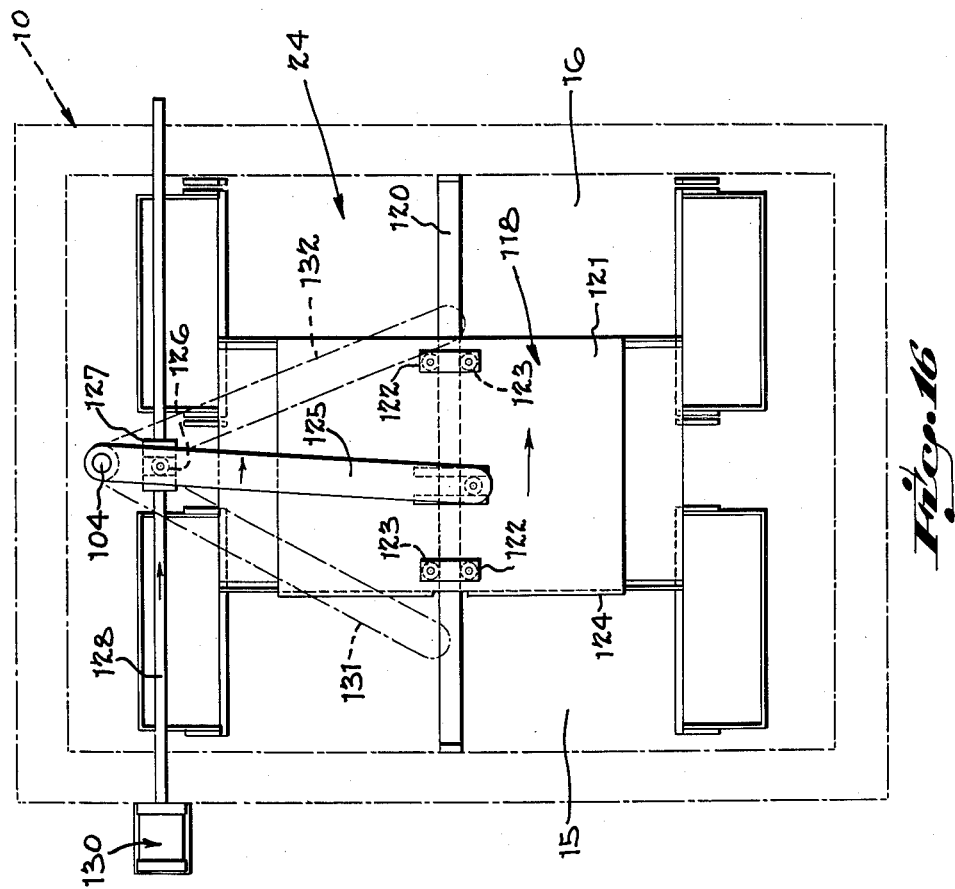
FIGURE 16 is a top plan view of the shuttle mechanism viewed along line 16—16 of FIGURE 14.

Preferred forms of transfer mechanisms for introducing pans into the oven, removing pans from the oven and transferring pans across the top of the oven from the up chamber to the down chamber are shown in FIGURES 15, 16, and 17 and the means for synchronizing the operation of the mechanisms with the lift ladders is shown in FIGURE 18.

More specifically, the mechanism 21 for feeding pans to the oven is best shown in FIGURES 14, 15, and 17. This mechanism comprises a carriage 97 which is mounted for reciprocating movement upon tracks 98 extending into the lowermost portion of the up chamber 15 of the oven. Carriage 97 comprises two upstanding spaced longitudinal walls 100 having vertical abutment shoulders 101 adjacent to the rear edges thereof. These walls 100 are spaced apart a distance wider than the pan plates 40 so that a strap of pans can be placed between walls 100 and supported by the engagement of outwardly extending flange of plate 40 with walls 100.

However, the flange extends outwardly beyond the walls 100 for engagement with lowermost bars 47 of the hold ladder in the up chamber and extensions 99 of these bars which are aligned with the bars 47 adjacent to the pan feeding opening of the oven. In the preferred embodiment, the upper edges of walls 100 of the carriage are slightly below the upper edges of the lowermost bars 47 of the hold ladders so that after the strap of pans has been forced onto the bars 47 the carriage can be retracted without disturbing the pans just fed to the oven.

In operation, transfer mechanism 21 is initially disposed in its outer position to the left as shown in FIGURE 15, and a strap of pans is placed between walls 100 with the flange of plate 40 resting on extensions 99 and the rear edge of the strap of pans in abutment with shoulder 101. These pans can be received either from a roller conveyor or can be manually positioned. The carriage is advanced along rails 98 by means of a driving mechanism 102 including an elongated pivotally mounted arm 103 disposed beneath the carriage. Arm 103 is mounted upon a vertical shaft 104, the shaft being rotatably journalled in bearings 105 mounted at the top and bottom of the oven. Arm 103 is rotated by shaft 104 between a retracted position indicated by broken lines at 106 in FIGURE 17 and an advanced position indicated by broken lines at 119 in FIGURE 17. The free end of arm 103 carries a pivotally mounted roller 107 disposed between spaced cross arms 108. These cross arms extend between walls 100 of transfer mechanism 21 and are secured to those members in any suitable manner such as by welding. When arm 103 moves to its advanced position 106 the strap of pans in engagement with abutments 101 is disposed completely within up chamber 15 and rests upon the lowermost set of support bars 47. Since walls 100 are disposed slightly beneath the support bars, when arm 103 is shifted outwardly to retract carriage 97, the carriage passes beneath the pans which remain in engagement with the hold ladders.

Carriage 97 also forms part of the discharge means indicated generally at 25 for discharging pans from down section 15 of the oven through discharge opening 110 onto bar extensions 111 similar to extensions 99. After the pans have been discharged from the oven they can be shifted onto a conveyor or other suitable mechanism or can be removed by hand. Discharge mechanism 25 includes a vertical U-shaped abutment member 109 mounted adjacent to the forward edge of the carriage and having an upper face 112 angulated upwardly and rearwardly. During the advance stroke of carriage 97, pusher element or abutment member 109 is shifted from its starting point adjacent to the center of the oven to a point adjacent to the side wall of the oven. In its travel, the pusher element engages the rear edge of a strap of pans carried by the lowermost set of bars 47 of the hold ladder in the discharge chamber. The pusher member slides the pans outwardly along bars 47 and extensions 111 of the bars.

As best shown in FIGURE 14 the top wall 113 of the discharge opening barely clears the top of pans 42, but does not provide clearance for lid or cover plate 43. As best shown in that figure, one preferred form of cover plate has a slightly upturned rim which engages the inner edge of wall 113 or some other suitable abutment disposed adjacent to the discharge opening. Thus, the discharged set of pans is pushed outwardly by pusher member 109 and the lid 43 of the set of pans is removed automatically, the rear edge of the lid being raised slightly by angulated face 112 of the abutment member. At the end of its advance, the rear edge 114 of abutment member 109 passes outwardly beyond the forward edge 115 of lid 43 and this lid drops back onto stationary bars 47 behind the pusher member.

On the return stroke of carriage member 97, pusher member 109 pushes this lid rearwardly through an opening in the lower portion of the oven, over connection bars 116 disposed between the lower bars 47 in the up and down oven sections. The lid passes up over the set of pans which have just been deposited in the up section by transfer mechanism 21. Pusher member 109 at the end of the return stroke of the carriage is disposed closely adjacent to the forward edge of the set of pans in the up section so that a lid is properly positioned on the pans. In this manner a lid is removed from each set of pans being discharged from the down section of the oven and the same lid is automatically returned to the up section of the oven and placed on the incoming set of pans.

Shuttle mechanism 24 for transferring pans from up chamber 15 to down chamber 16 is best shown in FIGURE 16. As there shown, the shuttle mechanism comprises a pusher member 118 which is slidably mounted at the top of the oven for reciprocating movement between the in and out chambers upon a longitudinal track 120. Pusher 118 comprises a horizontal plate 121 which carries two brackets 122 in engagement with track 120. Suitable roller bearings 123 are preferably mounted within the brackets for engagement with the sides of the track.

The rear edge of plate 121 carries a depending flange 124 or other suitable abutment for engagement with the rear edge of a strap of pans supported by the uppermost bars 47 of the hold ladder in up chamber 15. The pusher member 118 in its retracted or initial position is disposed adjacent to the oven wall containing the entrance opening. The pusher member is adapted to engage the uppermost pan in the up chamber and to shift that pan across bars 47 of the hold ladder in the lift chamber onto bars 47 of the hold ladder in down chamber 16. Suitable connecting bars in alignment with bars 47 are preferably provided between the ladders of the up and down chambers. Shuttle member 118 is moved by a pivotal arm 125 mounted upon vertical shaft 104. Arm 125 carries a roller 126 in engagement with a yoke member 127 carried by rod 128 joined to the piston of double acting hydraulic cylinder 130. As rod 128 is advanced and retracted (moved to the left and right in FIGURE 16), arm 125 is shifted between a retracted position shown by dotted lines 131 and an advanced position shown by dotted lines 132. It is to be understood that arm 125 in turn shifts shuttle member 118 from a position with flange 124 adjacent to the left hand, or entrance wall of the oven, to a position in which flange 124 has advanced slightly beyond the center of the oven. Arm 125 also rotates shaft 104 so that the shaft, arm 103, and carriage 97 are all shifted in synchronism with the transfer carriage.

FIGURE 18 shows diagrammatically an electric-hydraulic system for synchronizing operation of the hold and lift ladders and various transfer mechanisms. As there shown, hydraulic cylinder 130 houses a piston 133 which is mechanically interconnected to rod 128 for actuating the various transfer mechanisms. Similarly, cylinder 86 houses a piston 134 which is in turn mechanically interconnected to rod 85 for driving the lift and hold ladders. Piston 130 is double acting and is connected to fluid conduits 135 and 136 disposed at opposite ends of the piston. Similarly, these conduits are in turn connected to a four-way solenoid valve 137, the valve being connected to pump 138 through fluid line 140 and the sump 141 through fluid line 142. In a similar manner, cylinder 86 is connected to conduits 140 and 143, the conduits in turn being connected to a four-way solenoid operated valve 144. Valve 144 communicates with conduit 140 which provides a connection between the valve and pump 138 and conduit 145 for returning fluid to sump 141.

When valve 137 is energized, fluid under pressure flows from pump 138 through conduit 140, valve 137, and conduit 135 to force piston 133 to the right. Fluid in front of the piston is exhausted through conduit 136 and returns through valve 137 and conduit 142 to the sump. When valve 137 is deenergized, fluid under pressure passes from pump 138 and conduit 140 through valve 137 and conduit 136 to the chamber in front of piston 133 and forces that piston to the left. The fluid trapped behind the piston is discharged through conduit 135, and valve 137, and returns through conduit 142 to sump 141. In a similar manner, when valve 144 is energized fluid pressure is introduced through line 140 behind piston 134 and when the solenoid of valve 144 is deenergized, fluid is introduced in rear of piston 134 to drive that piston to the right.

Solenoid actuated valves 137 and 144 are controlled by switches 146 and 147 respectively. Each of these switches is preferably a cam operated micro switch. Specifically, each of the switches 146 and 147 is connected to a power line 148 and is adapted to complete a circuit from that power line to one of the solenoid operated valves. Switch 146 includes a finger 150 disposed for engagement with cam 151 while switch 147 includes a finger 152 disposed for engagement with cam 153. Cams 151 and 153 are mounted upon shaft 154 of a timing mechanism including a synchronous motor 155 and a variable speed transmission 156.

It is to be noted that the cams are out of phase so that valve 137 is actuated to advance piston 133 to cause advancement and retraction of transfer mechanisms 21, 24, and 25, before the lift and hold ladders go through their cycle of operation. Similarly, valve 144 is actuated to advance and retract piston 134 to raise and lower the lift ladders before the transfer mechanisms are again actuated.

From the foregoing description of the principles of the present invention and the above disclosure of a preferred embodiment, those skilled in the art will readily comprehend various modifications of which the invention is susceptible. Thus, for example, it is contemplated that in a modified embodiment each of the cams associated with either the lift ladder or hold ladder can be replaced by a roller of a diameter equal to the desired horizontal displacement of the associated ladder. The cams associated with the other ladder are still of generally diamond shaped configuration and of a length substantially equal to the travel of the lift ladder; and of a width substantially equal to the diameter of the roller.

Having described my invention, I claim:

1. In a vertical oven, means for supporting a plurality of pans in vertically spaced relationship to one another and moving said pans vertiaclly in a step by step movement, said means including a hold ladder and lift ladder, said hold ladder and lift ladder including a plurality of vertically spaced pan engaging elements each adapted to simultaneously engage an edge of a baking pan of a series of superposed vertically spaced pans in the oven, the pan engaging elements associated with said hold ladder being spaced from one another the same distance as the pan engaging elements on said lift ladder, means mounting said hold ladder for horizontal movement into and out of engagement with said pans, means mounting the lift ladder for horizontal movement into and out of engagement with said pans and for vertical movement while the hold ladder is disengaged from the pans to move same vertically, driving means for moving said ladders whereby said hold ladder engages said pans when said lift ladder is withdrawn from engagement therewith and said lift ladder moves vertically in one direction a distance equal to the spacing of a pair of adjacent pan engaging elements when in engagement with said pans for displacing same vertically, said hold ladder being removed from engagement with said pans when said lift ladder is moved in said one direction vertically, said lift ladder being moved an equal amount in the opposite direction vertically when removed from contact with said pans.

2. In a vertical oven for baking bread including means for forcing a stream of air in countercurrent relationship with dough pans, means for supporting a plurality of pans in vertically spaced relationship with one another and for moving said pans vertically in a step by step movement, said means including a pair of generally channel-shaped hold ladders and a pair of lift ladders, one of said hold ladders and one of said lift ladders being disposed at opposite ends of said pans, each of said hold ladders including a plurality of vertically spaced pan supporting members, and a plurality of baffle elements extending transversely of said hold ladders for preventing the upward passage of the air stream within said hold ladder and thereby channeling the air stream between the pans, means for moving said hold ladders and said lift ladders in timed sequence, said hold ladders moving horizontally and said lift ladders moving rectilinearly, whereby said hold ladder engages said pans when said lift ladder is withdrawn from engagement therewith, and said hold ladder is removed from engagement with said pans when said lift ladder is in contact therewith, said lift ladder moving vertically in one direction when in engagement with said pans while said hold ladder is disengaged therefrom to move said pans vertically, and being moved an equal amount in the opposite direction vertically when removed from contact with said pans.

3. In a vertical oven for baking bread in a countercurrent stream of warm air, means for supporting a plurality of pans in vertically spaced relationship to one another and for moving said pans vertically in a step by step movement, said means including a generally channel-shaped hold ladder and lift ladder, said hold ladder and lift ladder being adapted to simultaneously engage the edges of a plurality of pans for supporting said pans in vertically spaced relationship to one another, baffle members associated with said hold ladders, said baffle members being disposed in spaced vertical relationship and being effective to prevent the upward passage of warm air along the edges of said pans whereby said air is channeled outwardly from said ladder between adjacent pans, means mounting said hold ladder for horizontal movement into and out of engagement with the edge of said pans, means mounting the lift ladder for horizontal movement into and out of engagement with said pans and for vertical movement, means for moving said ladders whereby said hold ladder engages said pans when said lift ladder is withdrawn from engagement therewith, and said hold ladder is removed from engagement with said pans when said lift ladder is in contact therewith, said lift ladder moving vertically in one direction when in engagement with said pans, while said hold ladder is disengaged therefrom to move said pans vertically, and being moved an equal amount in the opposite direction vertically when removed from contact with said pans.

4. In a vertical oven for heating articles carried through said oven in a plurality of receptacles, means for moving said receptacles vertically in a step by step movement, said means including a hold ladder and lift ladder, said hold ladder and lift ladder being adapted to simultaneously engage the edge of a receptacle for supporting said receptacle, said hold ladder being mounted for horizontal movement into and out of engagement with the edge of said receptacle, the lift ladder being mounted for horizontal movement into and out of engagement with said receptacle and for vertical movement while the hold ladder is disengaged from the receptacle to move same vertically, driving means for moving said ladders, whereby said hold ladder engages said receptacle when said lift ladder is moved vertically in one direction, and said hold ladder is removed from engagement with said receptacle when said lift ladder is moved in the opposite direction vertically, and displacing said lift ladder vertically in one direction when in engagement with said receptacle to move same vertically, and moving said lift ladder an equal amount in the opposite direction vertically when removed from contact with said receptacle, said driving means comprising an elongated vertical cam carried by said hold ladder and an elongated vertical cam carried by said lift ladder, said cams being disposed in vertical aligned contacting relationship when both said hold and said lift ladders are engaged with said receptacle, yieldable spring means urging said hold and lift ladders into engagement with said receptacles, means for raising and lowering said lift ladder, said cams associated with said lift ladder and said hold ladder being effective to cause outward horizontal movement of said lift ladder when said lift ladder is moved vertically in one direction and to cause outward movement of said holder ladder when said lift ladder is moved vertically in the opposite direction.

5. In a vertical oven for heating material carried through said oven in a plurality of receptacles covered by a plate member, said oven having an up chamber and a down chamber, an entrance opening in said up chamber, a discharge opening in said down chamber, means for raising receptacles in said up chamber and lowering receptacles in said down chamber, said last named means comprising spaced support bars in said up and down chambers adjacent to the entrance and discharge openings of said oven, means for introducing receptacles into said oven and discharging receptacles therefrom, said last named means comprising spaced parallel loading bars extending outwardly from said entrance opening and spaced parallel unloading bars extending outwardly from said discharge opening, a carriage member, tracks for supporting said carriage member for reciprocating movement, the carriage member having an abutment member adjacent to the rear edge thereof, said abutment member being disposed intermediate the loading bars, and being adapted to engage the rear edge of a receptacle placed on said loading bars and to push said receptacle along the loading bars onto said support bars in said up chamber, and a pusher element mounted adjacent the forward end of said carriage and adapted to engage the edge of a receptacle disposed upon the support bars in said down chamber, and to push said receptacle outwardly onto said unloading bars, and power means for reciprocating said carriage member along said rails, abutment means disposed adjacent to said discharge opening for preventing movement of said plate member through said opening, said pusher element having means associated therewith for engagement with said plate member, whereby said pusher member is advanced beyond said plate member and being effective to return said plate member to said up chamber on retraction of said carriage member.

6. A vertical oven for heating material carried through the oven in a plurality of receptacles, said oven including a housing having side walls and a top, a gas impervious vertical wall extending transversely of the housing and dividing the oven into an up chamber and a down chamber, the top of said vertical wall being spaced downwardly from said oven top a sufficient distance to permit the passage of said receptacles from said up chamber to said down chamber, means for moving said receptacles in vertically spaced relationship upwardly in said up chamber, shuttle means for transferring said receptacles from said up chamber to said down chamber over said vertical wall, means for moving said receptacles in vertically spaced relationship downwardly in said down chamber, and means for introducing a stream of warm air into said down chamber adjacent to the lower end thereof, means disposed adjacent to opposite edges of said receptacles defining air passageways, said means including a plurality of vertically spaced baffles, the baffles adjacent each edge of said receptacles being spaced from one another a distance slightly greater than the height of two receptacles, the baffles adjacent one edge of the said receptacles being vertically offset from the baffles on the ladder adjacent the opposite side of the receptacles by a distance slightly greater than the height of one of said receptacles, whereby said air flows upwardly in said down chamber in serpentine fashion around the spaced receptacles therein over the top of said vertical wall, downwardly in said up chamber in serpentine fashion around the spaced receptacles therein and emerging from the bottom of said down chamber.

7. In a vertical oven for heating material carried through said oven in a plurality of receptacles covered by a plate member, said oven having an up chamber and a down chamber, an entrance opening in said up chamber, a discharge opening in said down chamber, means for raising receptacles in said up chamber and lowering receptacles in said down chamber, said last named means comprising spaced support bars in said up and down chambers adjacent to the entrance and discharge openings of said oven, means for introducing receptacles into said oven and discharging receptacles therefrom, said last named means comprising spaced parallel loading bars extending outwardly from said entrance opening and spaced parallel unloading bars extending outwardly from said discharge opening, a carriage member, tracks for supporting said carriage member for receiprocating movement, the carriage member having an abutment member adjacent to the rear edge thereof, said abutment member being disposed intermediate said loading bars, and being adapted to engage the rear edge of a receptacle placed on said loading bars and to push said receptacle along the loading bars onto said support bars in said up chamber, and a pusher element mounted adjacent the forward end of said carriage and adapted to engage the rear edge of a receptacle disposed upon the support bars in said down chamber, and to push said receptacle outwardly onto said unloading bars, and power means for reciprocating said carriage member along said tracks, abutment means disposed adjacent to said discharge opening for preventing movement of said plate through said discharge opening, said pusher element having a sloping upper face adapted to lift the plate as the pusher element is advanced beyond the plate member and having a rear face adapted to engage said plate upon return movement of said pusher element, and being effective to return said plate to said up chamber on retraction of said carriage member.

8. In a vertical oven for heating material carried through said oven in a plurality of receptacles covered by a plate member, said oven having an up chamber and a down chamber, a discharge opening in said down chamber, means for raising receptacles in said up chamber and lowering receptacles in said down chamber, said last named means comprising spaced support bars in the down chamber adjacent to the discharge opening of said oven, means for discharging receptacles from said oven, said last named means comprising spaced parallel unloading bars extending outwardly from said discharge opening, a carriage member, tracks for supporting said carriage member for reciprocating movement, said carriage member having a pusher element mounted adjacent the forward end of said carriage member, said pusher element being adapted to engage the rear edge of a receptacle carried by the support bars in said down chamber, and to push said receptacle outwardly onto said unloading bars, and power means for reciprocating said carriage member along said tracks, abutment means disposed adjacent to said discharge opening for preventing movement of said plate through said opening, said pusher member having a portion formed thereon in engagement with said plate member, whereby said pusher member is advanced beyond said plate member and being effective to return said plate member to said up chamber on retraction of said carriage member.

9. In a vertical oven for baking bread including means for forcing a stream of heated air in countercurrent relationship with dough pans advanced through the oven, means for supporting pans in vertically spaced relationship with one another and for moving said pans vertically in a step by step movement through said air stream, said pan moving means including a pair of hold ladders and a pair of lift ladders, one of said hold ladders and one of said lift ladders being disposed at opposite ends of said pans, each of said hold ladders including a plurality of vertically spaced pan supporting members, means for moving said hold ladders horizontally and said lift ladders rectilinearly in timed sequence, whereby said hold ladders engage said pans when said lift ladders are withdrawn from engagement therewith, and said hold ladders are removed from engagement with said pans when said lift ladders are in contact therewith, said lift ladders moving vertically in one direction when in engagement with said pans while said hold ladders are disengaged therefrom to move said pans vertically, and being moved an equal amount in the opposite direction vertically when removed from contact with said pans, said last named means comprising a first diamond shaped cam secured to said hold ladders and a second cooperating diamond shaped cam secured to said lift ladders in vertical alignment with said first cam when the hold and lift ladders are in engagement with the pans, and spring means for urging said hold and lift ladders into engagement with said pans.

10. In a vertical oven for baking bread including means for forcing a stream of heated air in countercurrent relationship with dough pans advanced through the oven, means for supporting pans in vertically spaced relationship relative to one another and for moving said pans vertically in a step by step movement through said air stream, said pan moving means including a pair of hold ladders and a pair of lift ladders, one of said hold ladders and one of said lift ladders being disposed at opposite ends of said pans, each of said hold ladders including a plurality of vertically spaced pan supporting members, means for moving said hold ladders horizontally and said lift ladders rectilinearly in timed sequence, whereby said hold ladders engage said pans when said lift ladders are withdrawn from engagement therewith, and said hold ladders are removed from engagement with said pans when said lift ladders are in contact therewith, said lift ladders moving vertically in one direction when in engagement with said pans while said hold ladders are disengaged therefrom to move said pans vertically, and being moved an equal amount in the opposite direction vertically when removed from contact with said pans, said last named means comprising a diamond shaped cam secured to one of said hold or lift ladders and a cooperating member secured to the other of said ladders in vertical alignment with said first cam when the hold and lift ladders are in engagement with the pans, and spring means for urging said hold and lift ladders into engagement with said pans.

References Cited in the file of this patent
UNITED STATES PATENTS

| | | |
|---|---|---|
| 31,192 | Sellers | Jan. 22, 1861 |
| 1,425,314 | Bentz | Aug. 8, 1922 |
| 1,488,252 | House | Mar. 25, 1924 |
| 1,695,224 | Besta | Dec. 11, 1928 |

UNITED STATES PATENT OFFICE
CERTIFICATE OF CORRECTION

Patent No. 3,018,742                 January 30, 1962

Paul S. Ward

It is hereby certified that error appears in the above numbered patent requiring correction and that the said Letters Patent should read as corrected below.

Column 18, lines 18 to 20, for "having means associated therewith for engagement with said plate member, whereby said pusher member is" read -- being --; line 21, for "being" read -- having means associated therewith for engagement with said plate member, whereby said pusher member is --; column 19, lines 36 to 38, for "having a portion formed thereon in engagement with said plate member, whereby said pusher member is" read -- being --; line 39, for "being" read -- having a portion formed thereon in engagement with said plate member, whereby said pusher member is --.

Signed and sealed this 28th day of August 1962.

(SEAL)
Attest:

ESTON G. JOHNSON                        DAVID L. LADD
Attesting Officer                    Commissioner of Patents